United States Patent [19]
Huber et al.

[11] Patent Number: 5,132,133
[45] Date of Patent: Jul. 21, 1992

[54] REDUCED CALORIE, PALATABLE SNACK PRODUCT AND METHOD OF PRODUCING SAME

[75] Inventors: Gordon R. Huber; Marc L. Wenger; Eric S. Sevatson, all of Sabetha, Kans.

[73] Assignee: Wenger Manufacturing, Inc., Sabetha, Kans.

[21] Appl. No.: 758,139

[22] Filed: Sep. 11, 1991

[51] Int. Cl.$^5$ .......................... A23L 1/00; A23P 1/00
[52] U.S. Cl. .................................. 426/241; 426/242; 426/448; 426/462; 426/439; 426/808
[58] Field of Search .............. 426/241, 242, 448, 449, 426/450, 462, 439, 507, 516, 808

[56] References Cited

U.S. PATENT DOCUMENTS 3,694,220  9/1972  Pierce ................................. 426/242
4,555,409  11/1985  Hart ..................................... 426/242
4,778,690  10/1988  Sadel et al. .......................... 426/448

OTHER PUBLICATIONS

The Microscopic Examination of Micronized and Extruded Cereals and Cereal Products, Kay Timmins, Spring, 1989.

Brochure entitled Co-Rating TX Twin Screw Food Extruder, Wenger Bulletin No. 56-9-88.

AIB Research Department Technical Bulleting, vol. XIII, Issue 4, Apr. 1991, Development and Utilization of Hard White Wheats.

*Primary Examiner*—George Yeung
*Attorney, Agent, or Firm*—Hovey, Williams Timmons & Collins

[57] ABSTRACT

A crisp, palatable, reduced calorie whole grain snack food is produced by subjecting initially tempering whole grains such as wheat, barley, corn, oats, rice and sorghum to a micronizing process wherein the whole grain(s) are partially precooked through application of near infrared radiation. Thereafter, the micronized grain is mixed with water and other optional ingredients and preconditioned with agitation and steam/water addition. After preconditioning, the mixture is directed to a twin screw extruder in order to form an extrudate of desired shape and size. The extrudate is then heat treated to crisp the outer surface thereof, typically through the use of oven heating and/or frying. The resultant snack product preferably has a whole grain content of at least about 50% by weight and a low total fat content on the order of about 20% by weight or less.

31 Claims, 5 Drawing Sheets

REDUCED CALORIE, PALATABLE SNACK PRODUCT AND METHOD OF PRODUCING SAME

BACKGROUND OF THE INVENTION

1. Field of the Invention

The present invention is broadly concerned with a nutritious, palatable, reduced calorie snack product and a method of producing such products, wherein use is made of very high proportions of whole grains. More particularly, in the method of the invention, whole grain(s) are first subjected to near infrared radiation (micronizing or torrification) in order to partially cook the grain, whereupon the grain and other optional ingredients are mixed with water, preconditioned and extruded; the extrudate is then heat treated, typically by oven drying and frying, to yield the final snack product.

2. Description of the Prior Art

Snack products such as potato and corn-based chips are produced and consumed in prodigious quantities both in the United States and around the world. Generally speaking, these products have a relatively high caloric content, in no small measure because of the fact that they are fried and absorb significant oil. Typically, chip-type snacks contain 25–30% by weight fat.

A growing segment of the snack-consuming public has expressed a desire for lower calorie, more nutritious snack products. By the same token, there is a perceived need to employ whole grains in snacks, rather than farinaceous meals (e.g., corn meal). It is believed that a snack product having a substantial fraction of whole grain products therein, and which has a reduced caloric content, would represent a significant break-through in the art. However, in order to be truly successful such a snack product must be palatable and conform to the taste requirements of the consuming public.

SUMMARY OF THE INVENTION

The present invention addresses the problems above, and provides a method of preparing a greatly improved reduced calorie snack product having a high whole grain content. In addition, the invention comprehends the final snack product, having a significant whole grain content and a total fat content of about 20% by weight or less.

Broadly speaking, the method of the invention comprises the steps of providing a quantity of whole grain, and typically a plurality of whole grain ingredients, and subjecting the individual whole grain products to near infrared radiation in order to cause rapid internal heating of the grain and consequent partial cooking thereof. The whole grain ingredients are preferably selected from the group consisting of wheat, barley, corn, oats, rice and sorghum, and are initially precooked to a level of from about 20–90% using near infrared radiation. Advantageously, the near infrared radiation step is carried out in so-called micronizing equipment.

In the next step, a mixture including the micronized whole grain(s), water and other optional ingredients is formed, with the mixture comprising at least about 30% by weight of whole grain, more preferably at least about 50% by weight thereof, and most preferably from about 50–90% by weight whole grain. The mixture is subjected to a preconditioning treatment wherein the mixture is agitated and the temperature thereof elevated to a level of from about 140°–240° F. This preconditioning is preferably carried out such that the starch fraction of the mixture is at least about 60% gelatinized.

The preconditioned mixture is then fed into a barrel of the extruder having therein a flighted, rotatable screw and an endmost extrusion die. The extruder screw is rotated to sequentially advance the mixture along the barrel through a cooking zone and ultimately the die to form an extrudate. During passage through the barrel, the temperature of the mixture is elevated to a maximum within the range of from about 180°–280° F. As the extrudate emerges from the die, it is subdivided through a knife or belt cutter assembly, to appropriately size the extrudate.

The final processing step involves heat treating the extrudate for crisping the same and forming the final product. A number of approaches are possible to achieve these ends, for example, use of multiple-pass or impingement drying equipment, together with frying either proceeding or following the drying step.

The preferred snack food product resulting from the method of the invention is in the form of a thin, crisp, fried eatable body having a whole grain content of at least about 50% by weight and a total fat content of about 20% by weight or less.

DESCRIPTION OF THE PREFERRED EMBODIMENTS

Figure 14:
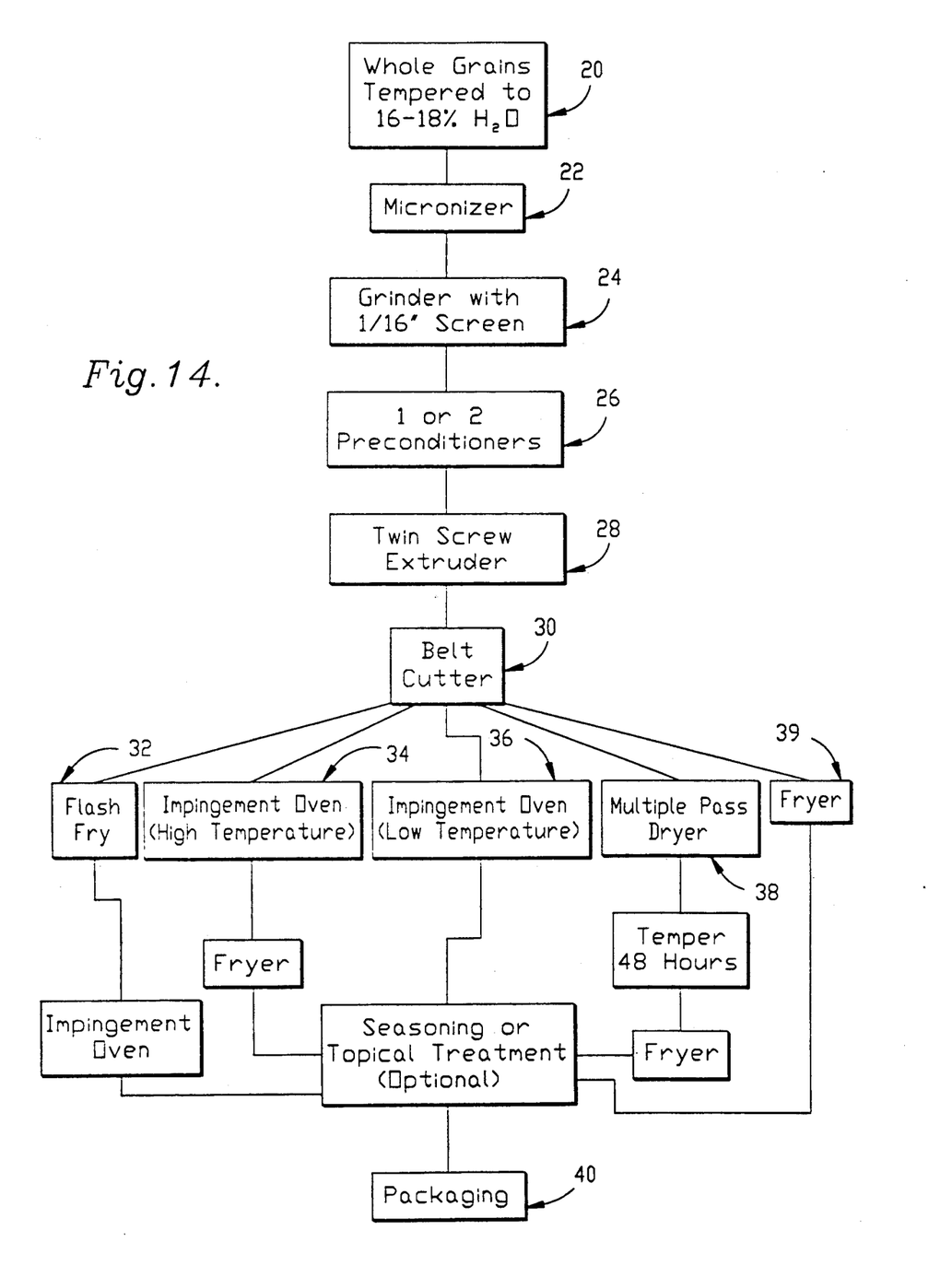
FIG. 14 is a flow diagram illustrating the steps of the preferred process of the invention.

Turning first to FIG. 14, a flow scheme for the production of snack products in accordance of the invention is set forth. In the first step 20, whole grain(s) of selected varieties and proportions are initially tempered in hot tap or ambient temperature water for a period of time sufficient to give a desired moisture content. Broadly, this moisture content should be from about 14-22% by weight, and more preferably from about 16-18% by weight. Tempering times are of course variable, and dependent upon the type of grain employed and the native moisture content thereof; moreover, tempering times can be shortened by using warm water and/or steam. Generally speaking however, the tempering should be carried out for a period of at least about 10 minutes using steam for example, and may be as long as 18 hours where cold water is used as the tempering medium.

The tempered grains are then subjected to near infrared radiation (step 22) in order to cause rapid internal heating of the grain and consequent partial cooking thereof. In preferred forms, use is made of so-called micronizing equipment to effect this preliminary treatment. Micronizing is basically a near infrared process, in which the radiation consists of "micron" sized wave lengths, basically in the range of from about 1.8-3.4 microns. Such near infrared radiation will penetrate the whole grain products, causing constituent molecules to vibrate at a frequency on the order of $8.8 \times 10^7$ MHz, up to $1.7 \times 10^8$ MHz. The resultant inter-molecular friction causes rapid internal heating and a rise in water vapor pressure. Different materials have different capacities to absorb near infrared radiation and convert it to heat. For example, internal temperatures of 90° C.-110° C. may be reached in less than 50 seconds in the case of cereal grains.

Micronizing is a relatively simple process, wherein the grain is conveyed along a moving belt over which a near infrared manifold is suspended. The belt is normally vibrated to ensure that the grain is constantly turned over, thus exposing all surfaces to the radiation. The rate of flow, and therefore the residence time in the micronizer, is controlled by adjusting the angle of the conveyor. Micronizing is described in U.S. Pat. No. 3,694,220, as well as a 1989 thesis by Kay Timmins entitled "The Microscopic Examination of Micronized and Extruded Cereals and Cereal Products", both of the latter being incorporated by reference herein.

In the context of the present invention, the micronizing treatment of the starting whole grain products should be carried out such that the grains are from about 20-90% cooked at the conclusion of the micronizing. The level of partial cook varies with particular grains, and is generally lowest for wheat, corn and oats, whereas rice is partially cooked to a greater extent. The requisite levels of precook are normally obtained by conveying the whole grain products through the micronizing zone for a period of time of from about 20-150 seconds, where the grain is subjected to near infrared radiation.

As indicated previously, a variety of whole grains may be employed. Most preferably, however, the preponderant grain is whole wheat, which will often make up about at least 50% by weight of the final snack product. Particularly advantageous results have been obtained through the use of hard white wheat. This wheat differs genetically from familiar hard red winter wheat only by containing the recessive gene for bran color (white color) at all three possible gene sites. Hard white wheat is described in an April, 1991 Technical Bulletin published by The American Institute of Baking, and this Bulletin is incorporated by reference herein.

Following micronizing, the whole grain products are preferably cracked or ground to ensure uniform sizing. As set forth in step 24 of FIG. 14, use of a 1/16" grinding screen is preferred, although a grind within the range of from about 1/64-⅛" would be acceptable.

The micronized and ground grain is then subjected to a preconditioning treatment (step 26) through the use of one or a plurality of preconditioners. Preconditioning involves forming a complete snack product mixture including the whole grain ingredients, water and optional ingredients such as flours or surfactants, and subjecting this mixture to agitation and heating for effecting additional cooking. Steam and/or water is normally added to the preconditioning chamber along with the grain and other ingredients, while the mixing shafts of the preconditioner are rotated. Preconditioning should be carried out such that the temperature of the mixture is elevated to a level of from about 140°-240° F., more preferably from about 190°-210° F., and with the starch fraction of the mixture being at least about 40-60% gelatinized. The moisture content of the final mixture exiting the preconditioner should be within the range of about 20-40% by weight, MCWB (moisture content wet basis). In order to achieve these conditions, the residence time of the mixture within the preconditioner should be within the range of from about 1-12 minutes, more preferably from about 1.5-5.0 minutes.

As indicated previously, staged preconditioning can be employed wherein the mixture is first processed through a first preconditioner and thence delivered into a second preconditioner.

After preconditioning, the partially cooked mixture is fed into the inlet of an extruder, and preferably a twin screw extruder of the type sold by Wenger Manufacturing, Inc. of Sabetha, Kans. This step is schematically illustrated as step 28 in FIG. 14. The extruder is configured to present at least a cooking zone and a final extrusion die, but preferably includes a cooking zone, a venting zone, a forming zone and finally the extrusion die. In this respect, the preconditioner/extruder setup is very similar to that depicted in U.S. Pat. No. 4,763,569, wherein the extruder includes a forming zone followed by a vented barrel and thence a forming zone leading to the die. Accordingly, U.S. Pat. No. 4,763,569 is incorporated by reference herein.

In the extruder, the mixture is subjected to increasing shear and the temperature is elevated to a maximum in the range of from about 180°-280° F., and more preferably from 180°-250° F., most preferably from about 190°-235° F. Typically, the maximum temperature in the cooking zone is the highest temperature which the mixture will experience in the extruder barrel. The residence time of the mixture within the cooking zone should be from about 10-60 seconds, and more preferably from about 10-30 seconds. Total residence time in the extruder barrel should range from about 20 seconds-3 minutes, and more preferably from about 40 seconds-2 minutes. The maximum pressure conditions within the barrel are normally in the range from about 200-1500 psi, more preferably about 400-1000 psi.

Exposure of the mixture in the venting zone cools the mixture before it enters the forming zone and die. As such, the final extruded product has a lower moisture content and can be more readily dried and/or fried after extrusion. If desired, negative pressure may be created in the venting zone by means of a barrel-mounted vacuumizing assembly including a vacuum pump. This enhances moisture removal from the extrudate and facilitates cooling of the mixture in the barrel. The preferred vacuumizing assembly is also illustrated in U.S. Pat. No. 4,763,569.

A belt cutter 30 is employed to receive the extrudate emerging from the extruder. This belt cutter is of conventional design and includes a conveying belt and a mechanism for subdividing the extrudate into appropriate lengths. Alternately, a shiftable knife could be used.

The extrudate may be treated in a variety of ways to create the necessary degree of crispness in the final food product. Preferred alternatives are set forth in FIG. 14. In a number of these techniques, use is made of an impingement oven, which is a well-known device having a moveable screen-type conveyor and means for creating jets of hot cooking gases directly onto a product supported on the conveyor. It has been found that such an impingement oven rapidly dries the extrudate and shortens required frying times.

Referring specifically to FIG. 14, one final treatment 32 involves flash frying of the extrudate, followed by impingement oven treatment. Flash frying would typically be carried out for a period of from about 1-5 seconds using cooking oil at a temperature of from about 350°-450° F. Impingement oven treatment may involve a residence time in the oven of from about 30 seconds-3 minutes, using air at a temperature of from about 350°-600° F.

Another final treatment 34 includes the steps of initial impingement oven treatment at the conditions specified in connection with treatment 32, followed by frying. Such frying would normally be carried out for a period of 5-30 seconds using frying oil at a temperature of 350°-450° F.

Another final treatment sequence 36 includes the step of low temperature impingement oven treatment (residence time of about 30 seconds-3 minutes, air temperature of from about 275°-375° F.).

A still further subsequent treatment scheme 38 is set forth in FIG. 14, which involves use of a multiple-pass dryer of conventional design. Such equipment normally employs air at a temperature from about 150°-225° F., with total residence times on the order of 15-45 minutes (including the cooling stage). After such drying, the product may be tempered for a period sufficient to assure equilibration of the moisture content in the product. Such a tempering period, normally carried out in ambient air, may range from 1-7 days. After tempering, the product is then fried using the conditions described in treatment 34.

A final exemplary alternative referred to by the numeral 39 in FIG. 14 involves direct frying of the extrudate, again using the conditions of treatment 34.

It will be understood that a variety of subsequent treatments can be employed, and those depicted in FIG. 14 are for purposes of illustration only. In all cases, of course, the products may be topically seasoned (e.g., by spraying the products with high fructose corn syrup, followed by sprinkling with seasonsings such as sesame or sunflower seed. Thereafter, the products are packaged as at 40, using any convenient packaging process.

One preferred class of final snack products are those in the form of thin, crisp, fried, eatable bodies having a whole grain content of at least about 50% by weight and a total fat content of about 20% by weight. Preferably, the snack bodies have a whole wheat content of at least about 50% by weight and a whole grain content (including the wheat fraction) of at least about 80% by weight.

Figure 1:
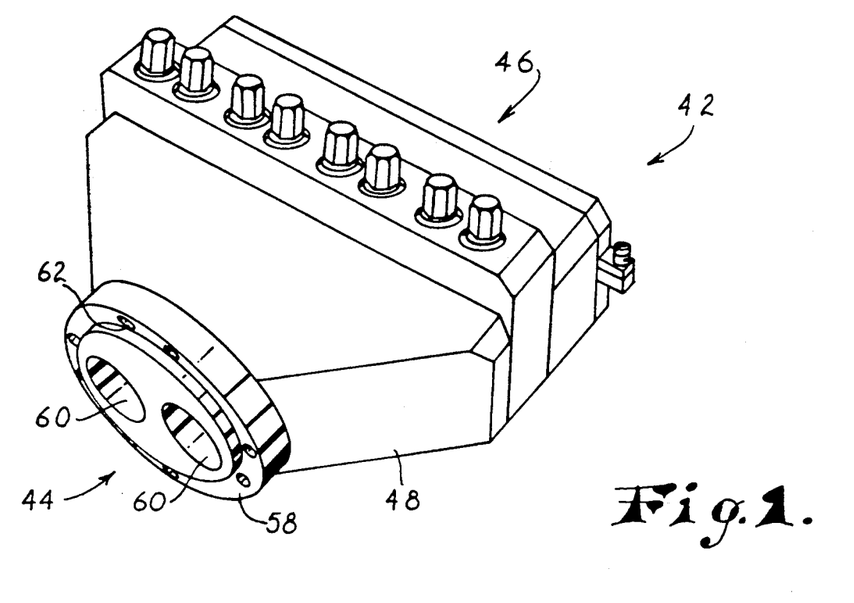
FIG. 1 is a perspective view of an extruder die useful in carrying out the method of the invention.
Figure 2:
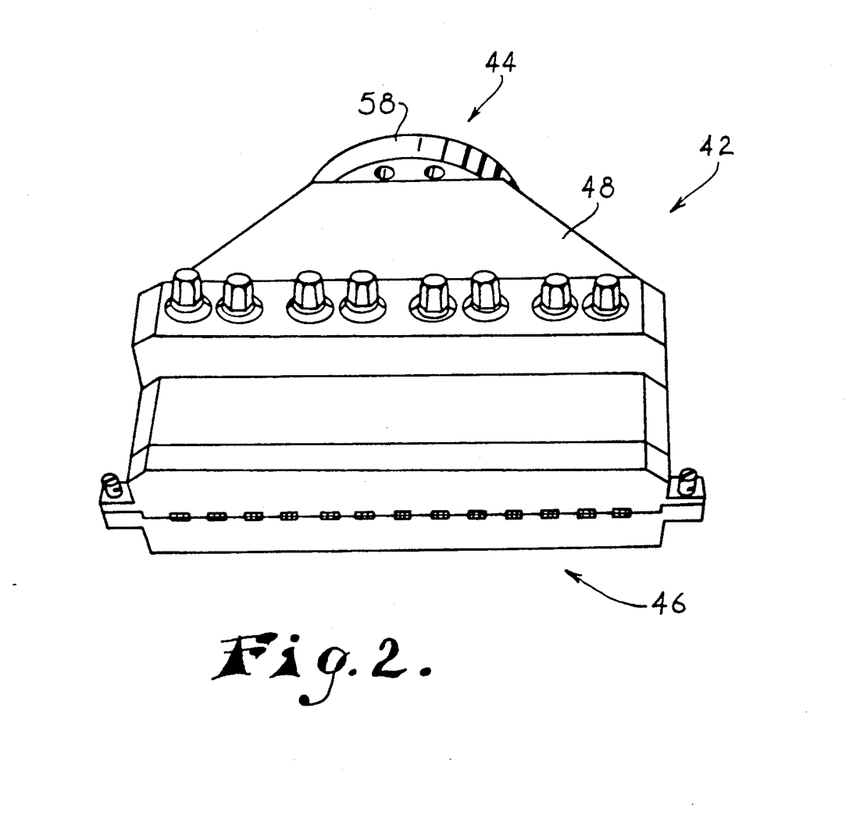
FIG. 2 is another perspective view of the die illustrated in FIG. 1, showing the exit end of the die.
Figure 3:
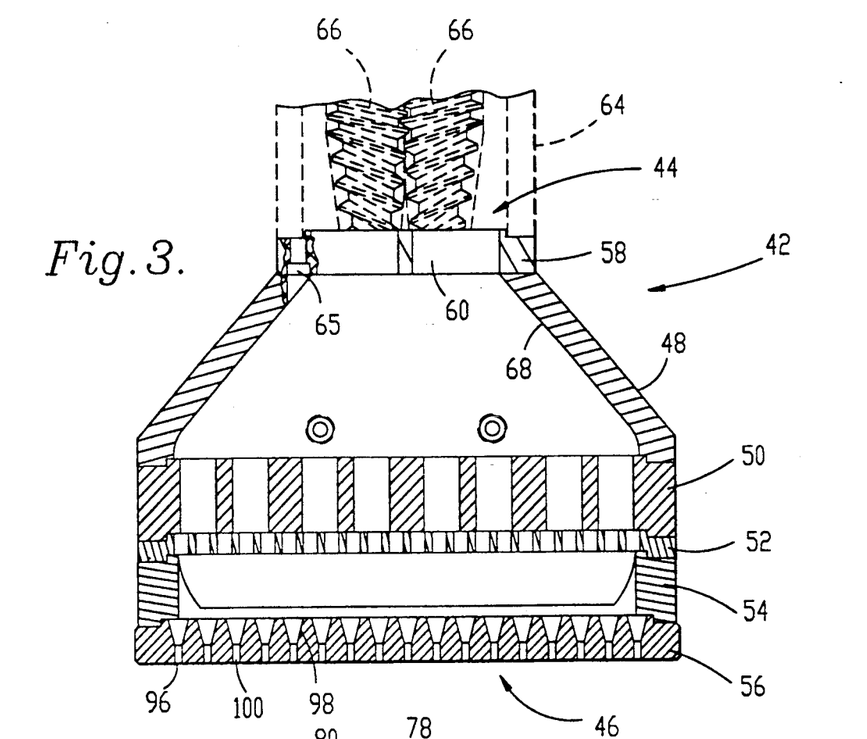
FIG. 3 is a horizontal sectional view of the die depicted in FIGS. 1-2, shown mounted onto the end of a twin screw extruder.

FIGS. 1-13 illustrate the preferred extrusion die 42 useful in the practice of the present invention. The die 42 includes a circular inlet end 44 and an opposed, extrudate outlet end 46. Referring to FIG. 3, it will be seen that die 42 is formed of multiple, interconnected components, namely a diverging transition section 48, a flow adjustment section 50, breaker plate 52, converging transition section 54 and final die plate 56.

Figure 5:
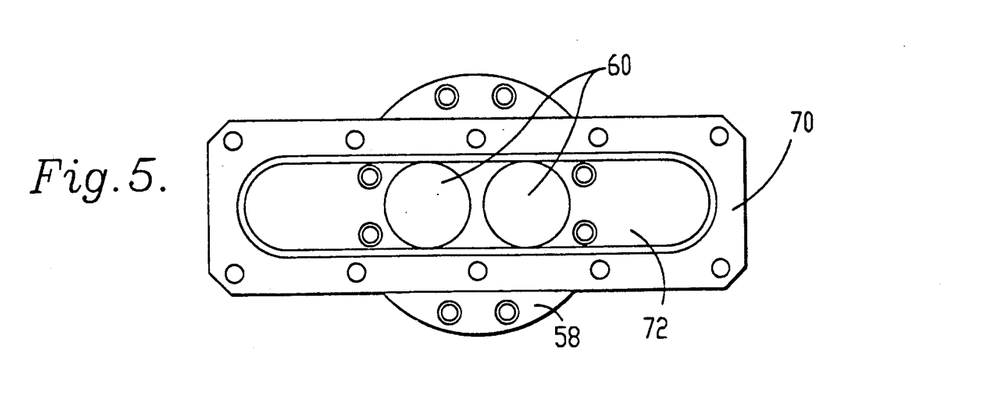
FIG. 5 is an elevational view of the rearmost diverging transition section of the die assembly.

In detail, the transition section 48 includes a circular end plate 58 presenting a pair of side-by-side product entry openings 60 therethrjough, together with a plurality of circumferentially spaced mounting apertures 62. As illustrated in FIG. 3, the plate 58 is adapted to mate to the open end of twin screw extruder barrel 64, with screw 65 passing through the apertures 62 being employed to fasten the plate 58 in place. The twin extrusion screws 66 of the extruder terminate adjacent the rearward face of plate 58 as shown. A diverging, somewhat frustoconical wall 68 extends forwardly from the plate 58 and defines, at the outer end thereof, an apertured mounting flange 70 presenting an oblong product exit opening 72.

Figure 6:
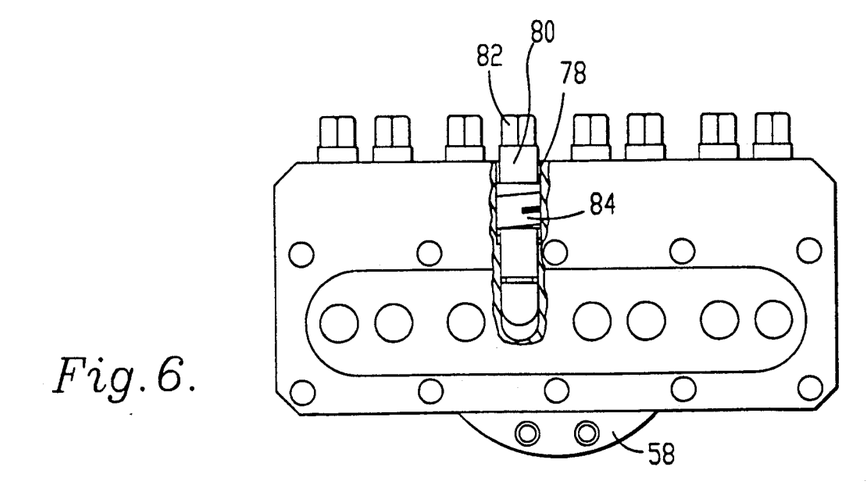
FIG. 6 is an elevational view, with parts broken away to illustrate internal construction, of the flow adjustment section of the die.
Figure 7:
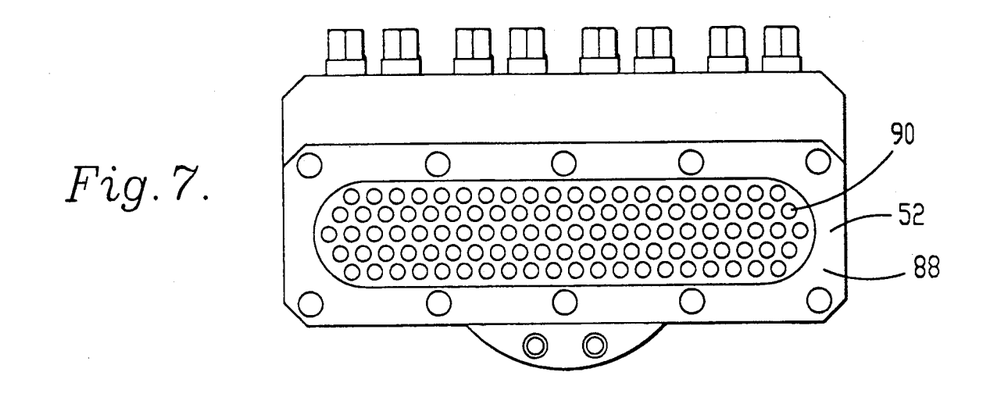
FIG. 7 is a view similar to that of FIG. 6, but illustrating the perforate breaker plate affixed to the exit end of the flow adjustment section of the die.

The flow adjustment section 52 is sized to abut flange 70 and extend forwardly therefrom. The section 52 includes mounting apertures arranged to mate with those of flange 70, and moreover includes an upstanding, transversely extending head 74 and a series of fore and aft extending, product flow passageways 76 therethrough. Head 74 is equipped with a series of laterally spaced apart, upright threaded openings 78 therein which respectively communicate with a corresponding passageway 76. Each opening 78 has a threaded flow adjusting plug 80 therein, the latter having a wrench head 82, a threaded section 84 and a lowermost rounded section 86 which extends into the associated passageway 76 (see FIG. 4). The respective plugs 80 are individually adjustable so as to extend the corresponding sections 86 thereof into the associated passageways 76 to a greater or lesser extent, thereby altering the flow through each individual passageway.

Breaker plate 52 (see FIG. 7) is adapted to be positioned adjacent the outlet face of section 50, and to this end includes an apertured flange section 88 whose apertures mate with those of section 50 and flange 70. Moreover, the plate 52 has a number of centrally located, small openings 90 therethrough in the region directly opposed to the passageways 76 which feed into the central openings 90.

Figure 8:
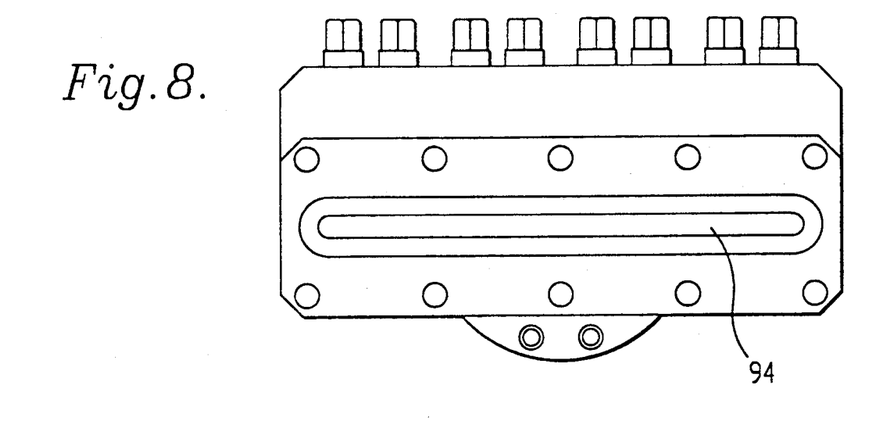
FIG. 8 is an elevational view similar to FIG. 7, but showing the converging transition head of the die.
Figure 9:
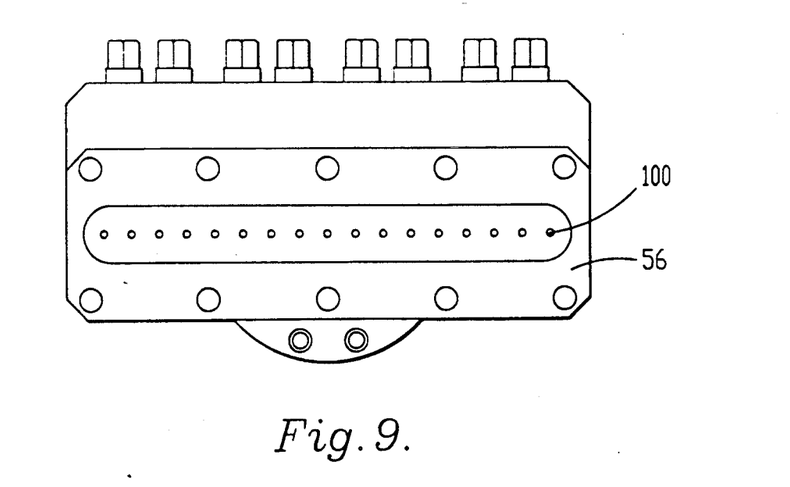
FIG. 9 is an elevational view of the complete die, showing one embodiment of the final apertured die plate.

Converging transition section 56 is designed to abut breaker plate 52 and again has marginal connection apertures aligned with the breaker plate apertures. The section 54 also has converging internal walls 92 leading from the outlet face of breaker plate 52 and converging to a relatively narrow, oblong outlet slot 94.

The final component of the overall die assembly 42 is the forwardmost die plate 56. This component includes the marginal connection apertures aligned with those of section 54 and final product-shaping opening(s) 96. In the case of the die plate 56 illustrated in FIG. 9, it will be observed that the openings 96 include a rearmost converging section 98 of circular cross-section, as well as a cylindrical exit section 100. Thus, with the use of the illustrated die plate 56, the product emerges in the form of elongated, essentially straight strings.

Figure 10:
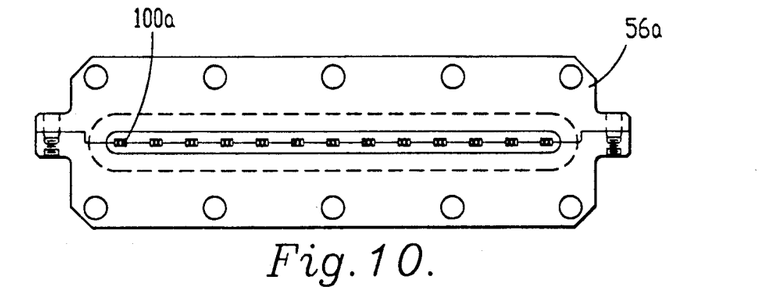
FIG. 10 is a front elevational view of another type of final apertured die plate.
Figure 13:
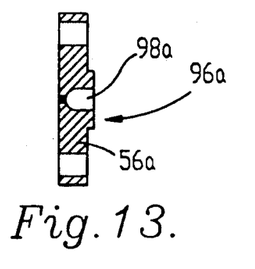
FIG. 13 is a vertical sectional view of the die plate illustrated in FIG. 10.

FIGS. 10 and 13 illustrate another die plate 56a. In this instance, the plate 56a includes openings 96a having a rearmost enlarged section 98a and, for each of the latter, a series of three juxtaposed small rectangular openings 100a.

Figure 11:
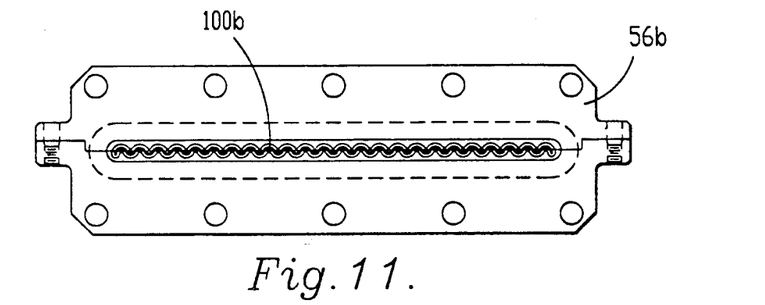
FIG. 11 is a front elevational view of yet another final apertured die plate.
Figure 12:
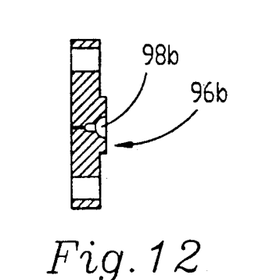
FIG. 12 is a vertical sectional view of the die plate depicted in FIG. 11.

The final illustrated die plate embodiment 56b is shown in FIGS. 11 and 12, and presents a series of spaced apart openings 96b in the rearward face thereof. Each of the latter is in the form of a rounded, stepped opening 98b, with the latter communicating with a single, arcuate opening 100b in the outlet face of the die plate. As shown, the opening 100b presents a series of alternating and reversing arcuate portions, such that the final extrudate emerging from this die plate is in the form of a wavy body in cross-section, approximating the configuration of lasagna pasta.

Figure 4:
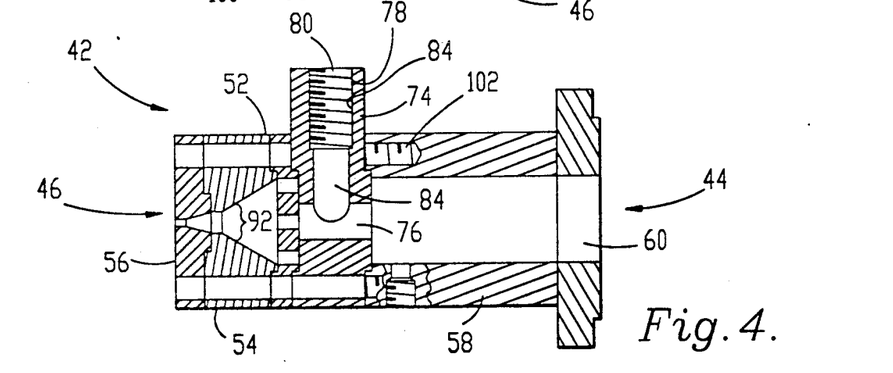
FIG. 4 is a vertical sectional view illustrating the construction of the die depicted in FIG. 3.

Appropriate threaded connectors 102 are employed to interconnect the above-described die components, as best shown in FIG. 4.

The following Examples sets forth a series of production Runs in accordance with the invention. It is to be understood that this Example is presented by way of illustration only, and nothing therein should be taken as a limitation in the overall scope of the invention.

EXAMPLE

A number of test runs were conducted to produce various snack products in accordance with the invention. A total of four separate whole grain formulas were employed in the test, as follows:

| Formula 1 | | |
|---|---|---|
| Ingredient | % By Weight | Lbs. |
| Hard White Wheat | 20.00 | 20.00 |
| Cake Flour | 35.00 | 35.00 |
| Sorghum (white) | 7.50 | 7.50 |
| Oat Groats | 5.00 | 5.00 |
| Barley (Hulless) | 7.00 | 7.00 |
| Corn (White) | 7.50 | 7.50 |
| Corn (Yellow) | 7.50 | 7.50 |
| Brown rice | 10.00 | 10.00 |
| Myvaplex 600 | 0.50 | 0.50 |

| Formula 2 | | |
|---|---|---|
| Ingredient | % By Weight | Lbs. |
| Hard White Wheat | 40.00 | 20.00 |
| Brown Rice | 30.00 | 15.00 |
| Oat Groats | 15.00 | 7.50 |
| Barley (Hulless) | 15.00 | 7.50 |

| Formula 3 | | |
|---|---|---|
| Ingredient | % By Weight | Lbs. |
| Hard White Wheat | 50.13 | 25.00 |
| Wheat Bran | 9.63 | 4.80 |
| Brown Rice | 19.45 | 9.70 |
| Oat Groats | 9.02 | 4.50 |
| Barley (Hulless) | 8.02 | 4.00 |
| Sugar | 3.01 | 1.50 |
| Myvaplex 600 | 0.74 | 0.37 |

| Formula 4 | | |
|---|---|---|
| Ingredient | % By Weight | Lbs. |
| Hard White Wheat | 52.70 | 52.70 |
| Wheat Bran | 10.40 | 10.40 |
| Brown Rice | 13.00 | 13.00 |
| Oat Groats | 9.80 | 9.80 |
| Barley (Hulless) | 8.60 | 8.60 |
| Brown Sugar | 3.25 | 3.25 |
| Myvaplex 600 | 0.75 | 0.75 |
| Salt | 1.50 | 1.50 |

Using each of these respective formulas, the first step was to temper the whole grain ingredients of each formula in initially warm (135° F.) temperature water for periods of from about 4 to 12 hours, until the moisture content of the grains equilibrated at a level of about 16-18% by weight, MCWB. At this point the whole grain fractions were micronized by subjecting the individual grain ingredients to near infrared radiation as they were passed along a micronizing conveyor. In all instances the maximum main vibrator frequency was employed, with the conveyor incline retention time and gas valve settings being recorded as follows:

TABLE 1

| Grain | Incline Setting of Main Vibrator (Inches) | Retention Time (Seconds) | Main Gas/ Air Butterfly Valve Setting (1-10) |
|---|---|---|---|
| Oat Groats | 9.5 | 24 | 2.75 |
| Brown Rice | 6.0 | 32 | 7.00 |
| White Sorghum | 1.0 | 110 | 10.00 |
| Hard White Wheat | 7.5 | 35 | 7.50 |
| Barley | 7.5 | 35 | 5.5-6.5 |
| White Corn | 5.5 | 40 | 10.00 |
| Yellow Corn | 5.5 | 40 | 10.00 |

The whole grain ingredients of the formulas tested were measured in the raw and micronized state for moisture content, total starch content, gelatinized and damage starch content, and percentage cook. This data is set forth on the following Table.

TABLE 2

| GRAIN | MOISTURE (MCWB) | TOTAL STARCH | GELANTINIZED STARCH[1] | % COOK[1] |
|---|---|---|---|---|
| Raw Barley | 8.84% | 58.25% | 10.46% | 17.97% |
| Micro Barley | 12.77% | 55.09% | 23.73% | 43.08% |
| Raw White Wheat | 9.80% | 61.06% | 12.97% | 21.24% |
| Micro White Wheat | 12.18% | 60.87% | 17.42% | 28.62% |
| Raw White Corn | 9.80% | 57.04% | 19.35% | 33.95% |
| Micro White Corn | 12.23% | 57.52% | 23.78% | 41.36% |
| Raw Yellow Corn | 9.75% | 63.83% | 15.75% | 27.01% |
| Micro Yellow Corn | 12.63% | 65.73% | 20.81% | 31.66% |
| Raw Groats | 6.43% | 48.21% | 11.15% | 24.58% |
| Micro Groats | 10.41% | 48.21% | 14.66% | 31.50% |
| Raw Milo | 9.96% | 61.57% | 15.59% | 25.33% |
| Micro Milo | 9.39% | 61.18% | 22.64% | 37.02% |
| Raw Brown Rice | 9.69% | 60.04% | 23.92% | 39.84% |
| Micro Brown Rice | 9.55% | 60.29% | 52.94% | 87.80% |

[1]Also includes damages starch in grain, particularly in the raw form thereof

The tempered and micronized whole grain ingredients were next ground through a 16-mesh screen to achieve uniform sizing. At this point the whole grain and remaining ingredients of the respective formulas were mixed together, in the proportions set forth above.

The formulas were then subjected to preconditioning, extrusion processing and various final cooking steps in order to yield finished snack products. In each instance the preconditiner employed was a Wenger DDC preconditioner of the type described in U.S. Pat. No. 4,752,139, which is incorporated by reference herein. In the preconditioner, steam and water were added with intense mixing so as to at least partially precook the formulas before entering the extruder. The processing conditions followed in the preconditioning step are set forth in the following Table 2.

After preconditioning, the formulas were fed directly into a Wenger Model TX-52 twin screw extruder equipped with a total of nine interconnected heads and an extrusion die of the type illustrated in FIGS. 1-13. The TX-52 extruder is of the type described in U.S. Pat. No. 4,875,847, and a Wenger brochure entitled "TX Twin Food Extruder", both of the latter being incorporated by reference herein. External temperature control was maintained by circulation of cold water (CW) or hot oil (HO) through the surrounding jackets of the extruder heads. A conventional belt cutter assembly was situated adjacent the outlet of the extruder die, to create the desired end product. The extrusion conditions recorded during these tests are set forth in the following Table, where PPM=pounds per minute.

TABLE 3

Preconditioning Information:

|  |  | Run 1 | Run 2 |
|---|---|---|---|
| Mixing Cylinder Speed | RPM | 114 | 110 |
| Steam Flow to Mixing Cylinder | PPM | 0.175 | 0.166 |
| Water Flow to Mixing Cylinder | PPM | 0.324 | 0.470 |
| Mixing Cylinder Temperature | Deg. F. | 210.00 | 210.00 |

Extrusion Information:

|  |  | Run 1 | Run 2 |
|---|---|---|---|
| Extruder Shaft Speed | RPM | 230 | 230 |
| Motor Load | % | 22 | 15 |
| Steam Flow to Extruder | PPM | 0.107 | 0.107 |
| Water Flow to Extruder | PPM | 0.345 | 0.353 |
| Control/Temperature 2nd Head | Deg. F. | CW/99 | CW/100 |
| Control/Temperature 3rd Head | Deg. F. | CW/99 | CW/100 |
| Control/Temperature 4th Head | Deg. F. | HO/230 | HO/230 |
| Control/Temperature 5th Head | Deg. F. | HO/230 | HO/230 |
| Control/Temperature 6th Head | Deg. F. | HO/194 | HO/194 |
| Control/Temperature 7th Head | Deg. F. | CW/176 | CW/176 |
| Control/Temperature 8th Head | Deg. F. | CW/176 | CW/176 |
| Control/Temperature 9th Head | Deg. F. | CW/176 | CW/176 |
| Head/Pressure | PSIG | 8/0 | 8/0 |
| Head/Pressure | PSIG | 9/600 | 9/400 |

Final Product Treatment Information:

|  | Run 1 | Run 1A | Run 1B | Run 1C | Run 2 |
|---|---|---|---|---|---|
| Final Product Description | Sq. Chip | Sq. Chip | Sq. Chip | Sq. Chip | Sq. Chip |
| Formula Number | 1 | 1 | 1 | 1 | 2 |

Preconditioning Information:

|  |  | Run 3 |
|---|---|---|
| Mixing Cylinder Speed | RPM | 113 |
| Steam Flow to Mixing Cylinder | PPM | 0.177 |
| Water Flow to Mixing Cylinder | PPM | 0.650 |
| Mixing Cylinder Temperature | Deg. F. | 210.00 |

Extrusion Information:

|  |  | Run 3 |
|---|---|---|
| Extruder Shaft Speed | RPM | 160 |

TABLE 3-continued

| Motor Load | % | 30 |
|---|---|---|
| Steam Flow to Extruder | PPM | 0.174 |
| Water Flow to Extruder | PPM | 0.250 |
| Control/Temperature 2nd Head | Deg. F. | CW/100 |
| Control/Temperature 3rd Head | Deg. F. | CW/100 |
| Control/Temperature 4th Head | Deg. F. | HO/230 |
| Control/Temperature 5th Head | Deg. F. | HO/230 |
| Control/Temperature 6th Head | Deg. F. | VENT |
| Control/Temperature 7th Head | Deg. F. | CW/194 |
| Control/Temperature 8th Head | Deg. F. | CW/162 |
| Control/Temperature 9th Head | Deg. F. | CW/172 |
| Head/Pressure | PSIG | 8/400 |
| Head/Pressure | PSIG | 9/900 |

Final Product Treatment Information:

|  | Run 2A | Run 2B | Run 3 | Run 3A | Run 3B |
|---|---|---|---|---|---|
| Final Product Description | Sq. Chip | Sq. Chip | Sheet | Sheet | Sheet |
| Formula Number | 2 | 2 | 1 | 1 | 1 |

Preconditioning Information:

|  |  | Run 4 | Run 5 |
|---|---|---|---|
| Mixing Cylinder Speed | RPM | 114 | 113 |
| Steam Flow to Mixing Cylinder | PPM | 0.174 | 0.174 |
| Water Flow to Mixing Cylinder | PPM | 0.650 | 0.650 |
| Mixing Cylinder Temperature | Deg. F. | 210.00 | 210.00 |

Extrusion Information:

|  |  | Run 4 | Run 5 |
|---|---|---|---|
| Extruder Shaft Speed | RPM | 160 | 160 |
| Motor Load | % | 21 | 26 |
| Steam Flow to Extruder | PPM | 0.166 | 0.166 |
| Water Flow to Extruder | PPM | 0.250 | 0.250 |
| Control/Temperature 2nd Head | Deg. F. | 104 | 111 |
| Control/Temperature 3rd Head | Deg. F. | 104 | 111 |
| Control/Temperature 4th Head | Deg. F. | HO/230 | HO/230 |
| Control/Temperature 5th Head | Deg. F. | HO/230 | HO/230 |
| Control/Temperature 6th Head | Deg. F. | HO/Vent | HO/Vent |
| Control/Temperature 7th Head | Deg. F. | 194 | 201 |
| Control/Temperature 8th Head | Deg. F. | 176 | 176 |
| Control/Temperature 9th Head | Deg. F. | 176 | 181 |
| Head/Pressure | PSIG | 8/300 | 8/400 |
| Head/Pressure | PSIG | 9/700 | 9/800 |

Final Product Treatment Information:

|  | Run 3C | Run 4 | Run 4A | Run 5 | Run 5A |
|---|---|---|---|---|---|
| Final Product Description | Sheet | Sheet | Sheet | Sheet | Sheet |
| Formula Number | 1 | 3 | 3 | 4 | 4 |

The extrudate from extruder Run 1 (used for final product treatment Runs 1-1C inclusive) was processed through the impingement oven (Lincoln Impinger, Model 1240, sold by Lincoln Food Services, Inc. of Fort Wayne, Ind.) for one minute forty-five seconds, using 490° F. air. In the case of Run 1A, the extrudate was first dried in a multiple-pass dryer using 180° F. air with retention times in the first pass, second pass, and cooler being 10.8, 20.3 and 10.2 minutes respectively. Thereupon, the dried extrudate was fried at 400° F. to give a crisp snack product. In Run 1B, the extrudate was multiple-pass dried as set forth above, but was allowed to temper in ambient air for a period of seven days. At this point the product was fried at 400° F. for twelve seconds.

In Run 1C, the extrudate was directly fried at 400° F. The product in extruder treatment Run 2 (used for final product treatment Runs 2-2B inclusive) was first flash fried for two seconds at 400° F., and then passed through the impingement oven for period of one minute forty-five seconds, using 490° F. air. The total fat content of this product was measured and found to be 18.11% by weight. In Run 2A, the extrudate was subjected to impingement oven treatment for one minute forty-five seconds, using 490° F. air. During this treatment, baking powder was fed into the downspout of the impingement dryer.

The extrudate used in treatment Run 2B was subjected to impingement oven treatment using 490° F. air. The extrude from extruder Run 3 was used in final treatment Runs 3-3C inclusive. This extrudate in treatment Run 3 was handled as set forthin the case of final treatment Run 2B, except that the extrudate was first top surface sprayed with high fructose corn syrup and sprinkled with sesame seeds before impingement oven treatment. Final treatment Run 3A was the same as Run 2B, except that 495° F. air was used in the impingement oven.

In Run 3B, the product was multiple-pass dried using 180° F. air with retention times in the first pass, second pass, and cooler of 20.0, 20.3 and 10.2 minutes respectively. Thereupon, the product was fried at 400° F. for twelve seconds. In Run 3C, the extrudate was passed through the impingement oven for one minute forty-five seconds using 345° F. air, whereupon it was fried at 400° F. for twelve seconds. During this final treatment Run, the belt cutter speed was increased to stretch the product coming off the extruder and make it thinner. In final treatment Run 4, the extrudate from extruder Run 4 was used (as it was in treatment Run 4A) was subjected to the same impingement oven treatment as in Run 3C, but prior to such treatment the extrudate was topically sprayed with high fructose corn syrup and sprinkled with sesame seed and course ground sunflower seed. Wheat bran was also sprinkled on the product.

The extrudate used in treatment Run 4A was dried as detailed in connection with Run 3B, and fried at 400° F. for twelve seconds. A portion of this treatment Run was further treated by the addition of butter flavoring after frying. In Run 5, the extruded product from extruder Run 5 was treated in the impingement oven for one minute forty-five seconds using 350° F. air, followed by frying at 400° F. for twelve seconds. The extrudate in final treatment Run 5A was subjected to impingement oven treatment (one minute forty-five seconds using 350° F. air) followed by frying (400° F. for twelve seconds). The product was then topically coated with ground cinnamon granola. This product was analyzed to contain, an "as is" basis: protein, 10.7% by weight; fat, 18.2% by weight; carbohydrates, 63.8% by weight; calories, 462/100 g; sodium, 0.548% by weight; potassium, 0.45% by weight; calcium, 0.07% by weight; and iron, 76.5 ppm.

The snack products were all satisfactory, but those made using Formula 4, final treatment Run 2, were deemed the best.

We claim:

1. A method of preparing a food product, comprising the steps of:
   providing a quantity of a whole grain;
   subjecting said grain to near infrared radiation in order to cause rapid internal heating of the grain and consequent partial cooking thereof;
   forming a mixture comprising at least about 30% by weight of said partially cooked grain and water, and subjecting the mixture to a preconditioning step wherein the mixture is agitated and the temperature thereof is elevated to a level of from about 140°-240° F., such that the starch fraction of the mixture is at least about 60% gelatinized;
   passing said preconditioned mixture into the barrel of an extruder having therein a flighted, rotatable screw and an endmost extrusion die;
   rotating said screw to sequentially advance said preconditioned mixture along said barrel through a cooking zone and said die to form an extrudate, the temperature of said mixture within said barrel reaching a maximum within the range of from about 180°-280° F.; and
   subsequently heat treating the extrudate for crisping the same and forming said food product.

2. A method as set forth in claim 1, wherein said mixture comprises at least about 50% by weight whole grain.

3. A method as set forth in claim 2, wherein the mixture comprises from about 50-90% by weight whole grain.

4. A method as set forth in claim 1, including the steps of providing a plurality of whole grain ingredients, individually subjecting said ingredients to near infrared radiation and forming said mixture comprising said plurality of whole grain ingredients.

5. A method as set forth in claim 4, said whole grain ingredients being selected from the group consisting of wheat, barley, corn, oats, rice and sorghum.

6. A method as set forth in claim 1, said mixture contains at least about 50% whole wheat.

7. A method as set forth in claim 1, including the steps of conveying said whole grain through a zone for a period of time of from about 20-150 seconds, and, during said period subjecting the whole grain to near infrared radiation.

8. A method as set forth in claim 1, including the step of elevating the temperature of said mixture during said preconditioning step to a level of from about 190°-210° F.

9. A method as set forth in claim 1, including the step of increasing the moisture content of the mixture during said preconditioning step by the addition of steam and/or water.

10. A method as set forth in claim 9, wherein the total moisture content of said mixture after said preconditioning step is from about 20-40% by weight.

11. A method as set forth in claim 1, including the step of subjecting said mixture to mixing in a preconditioner for a period of time of from about 1-12 minutes.

12. A method as set forth in claim 11, wherein said period of time is from about 1.5 to 5 minutes.

13. A method as set forth in claim 1, including the step of passing said preconditioned mixture into the barrel of a twin screw extruder.

14. A method as set forth in claim 1, including the steps of sequentially advancing said preconditioned mixture first through a cooking zone, then through a forming zone, and finally through said extrusion die.

15. A method as set forth in claim 14, including the step of subjecting the preconditioned mixture to a temperature of from about 180°-250° F. in said cooking zone, the maximum temperature of the mixture in said cooking zone being the highest temperature the mixture experiences in the extruder barrel.

16. A method as set forth in claim 15, wherein said temperature is from about 190°-235° F.

17. A method as set forth in claim 15, including the step of retaining said mixture in said cooking zone for a period of from about 10-60 seconds.

18. A method as set forth in claim 17, wherein said period is from about 10-30 seconds.

19. A method as set forth in claim 14, including the step of removing moisture from said mixture between said cooking and forming zones.

20. A method as set forth in claim 19, said moisture-removing step comprising the steps of passing the mixture through a venting zone, and withdrawing said moisture from said barrel in said venting zone.

21. A method as set forth in claim 20, including the step of creating reduced pressure conditions within said venting zone.

22. A method as set forth in claim 1, including the step of removing moisture from said mixture between said cooking zone and die.

23. A method as set forth in claim 1, said subsequent heat treating step comprising the step of drying the extrudate.

24. A method as set forth in claim 1, said subsequent heat treating step comprising the step of frying the extrudate.

25. A method as set forth in claim 1, including the step of topically applying seasoning to said formed food product.

26. A method as set forth in claim 1, including the step of subjecting mixture to a pressure of from about 200-1500 psi within said barrel.

27. A method as set forth in claim 1, said subsequent heat treatment step being carried out such that the final food product has a total fat content of about 20% by weight or less.

28. A method as set forth in claim 1, including the step of tempering said grain in water prior to subjecting the grain to said near infrared radiation.

29. A method as set forth in claim 1, including the step of grinding said whole grain.

30. A method as set forth in claim 29, wherein said whole grain is subjected to said near infrared radiation prior to said grinding.

31. A food product formed by the method of claim 1.

* * * * *